United States Patent [19]
Robinson et al.

[11] Patent Number: 5,696,521
[45] Date of Patent: Dec. 9, 1997

[54] VIDEO HEADSET

[75] Inventors: Jack D. Robinson, San Francisco; Clifton M. Schor, Oakland; Peter H. Müller, Los Gatos; Wayne A. Yankee, San Jose; Robert F. Young, Santa Cruz, all of Calif.; Stephen D. Fantone, Lynnfield, Mass.

[73] Assignee: Astounding Technologies (M) Sdn. Bhd., Sunnyvale, Calif.

[21] Appl. No.: 264,037

[22] Filed: Jun. 22, 1994

[51] Int. Cl.⁶ .................................................. H04N 13/04
[52] U.S. Cl. ........................................ 345/8; 348/53
[58] Field of Search .................. 345/8; 381/25, 381/94, 98; 359/637, 13; 224/262; 35/8 A; 348/88, 53; 355/1; H04N 13/04

[56] References Cited

U.S. PATENT DOCUMENTS

| | | | |
|---|---|---|---|
| 2,955,156 | 5/1960 | Heilig . | |
| 3,787,771 | 1/1974 | O'Connor | 325/65 |
| 3,923,370 | 12/1975 | Nostrom | 350/55 |
| 3,940,204 | 2/1976 | Wirthington . | |
| 4,153,913 | 5/1979 | Swift | 358/93 |
| 4,178,072 | 12/1979 | Rogers | 350/145 |
| 4,395,731 | 7/1983 | Schoolman | 358/88 |
| 4,468,101 | 8/1984 | Ellis | 350/538 |
| 4,517,418 | 5/1985 | Baran et al. | 179/156 R |
| 4,695,129 | 9/1987 | Faessen et al. | 350/96.25 |
| 4,761,056 | 8/1988 | Evans et al. | 350/174 |
| 4,821,323 | 4/1989 | Papicinik | 381/25 |
| 4,982,278 | 1/1991 | Dahl et al. | 348/88 |
| 5,040,058 | 8/1991 | Beamon, III | 358/103 |
| 5,050,214 | 9/1991 | Lee | 381/25 |
| 5,091,719 | 2/1992 | Beamon, III | 304/705 |
| 5,153,569 | 10/1992 | Kawamura et al. | 340/705 |
| 5,276,471 | 1/1994 | Yamauchi et al. | 345/8 X |
| 5,305,124 | 4/1994 | Chern et al. | 359/13 |
| 5,539,578 | 7/1996 | Togino et al. | 345/8 X |

*Primary Examiner*—Mark R. Powell
*Attorney, Agent, or Firm*—Thomas M. Freiburger

[57] ABSTRACT

A video headset is worn comfortably on the head of a user, supported by a pair of spaced apart straps extending over the top of the head and across the lower back of the head. The rear strap may be counterweighted. A pair of headphone type speakers are supported on pivoted arms from a frame of the headset, so as to be swingably adjustable to accommodate ear position. In a preferred embodiment, a pair of LCD video displays are positioned above the level of the user's eyes, each with a beam splitter positioned in front of the eyes to reflect a portion of the light from the video screens to the user. The partially transmissive beam splitters allow the user to see through to the ambient scene beyond, increasing the comfort of the user in viewing the video. A transparent shield preferably is positioned forward of the video optics, with an adjustment under the control of the user for controlling the brightness of the ambient light. The video screens and optics preferably set the user's convergence angle at about eight feet, for optimum comfort.

5 Claims, 6 Drawing Sheets

VIDEO HEADSET

BACKGROUND OF THE INVENTION

This invention is concerned with audio-video equipment, and in particular the invention relates to a video/audio headset worn on the head of the user, with provision for maximum comfort to the user.

Video headsets in various forms are known and have been sold as consumer products, as have simpler audio headsets. As examples, video headsets of various types, with or without three-dimensional viewing, are shown in U.S. Pat. Nos. 2,955,156 (Heilig), 3,923,370 (Mostrom), 4,153,913 (Swift), 4,395,731 (Schoolman), 4,695,129 (Faessen et al.), 4,761,056 (Evans et al.), 4,982,278 (Dahl et al.), 5,040,058 (Beamon) and 5,091,719 (Beamon).

Some of the disclosed devices are for recreational use, some for medical use and some for military use, such as in fighter aircraft. Some of the described video headset devices include half-mirrors presenting the video images to the user's eyes, so that the user can see through the mirrors to the ambient scene beyond. These include, for example, the Swift, Mostrom and Evans patents cited above. In addition, a headset has been marketed by Virtual Vision Inc. of Redmond, Wash. That product has a single video screen projected in front of one eye of the user, mounted on a transparent shield which allows the user to see the world beyond in a normal way. The video product is described as showing the video screen apparently floating in space ten feet in front of the user. Another video headset was designed to aid persons with low vision and had an onboard camera. That headset, which did not include sound speakers, was described in *NASA Tech Briefs*, February 1993, pg. 20.

It is an object of the present invention to enhance the comfort to the user in wearing a video/audio headset, both as to physical comfort of the headset on the head and as to minimizing eye strain to the user, as well as providing realistic images and sound to the user, and enabling the user to wear corrective eyeglasses while wearing such video/audio headset.

SUMMARY OF THE INVENTION

A video headset in accordance with the present invention is comfortably worn on the human head, and presents video images (which may be three-dimensional) and sound (preferably stereophonic and optionally "Surround Sound") to the user, with minimal eye strain and with adjustments for customizing the headset to the user's eyes, as to eye separation and other physical features.

The audio/video headset of the invention is supported on straps, preferably semi-rigid straps adjustable in length, which engage the top and lower back of the head, essentially conforming to the rear half of the cranium preferably without any contact at the top of the head and without the need to support the headset on the user's nose. The headset is lightweight and rests somewhat like a visor on the head. A pair of video screens are carried in the headset, one presenting images to each of the left and right eyes of the user. The screens are preferably mounted at a position above the level of the user's eyes, directed downwardly, with accompanying optics which reflect the images binocularly to the eyes. In a three-dimensional use of the headset, differences in the two images allow for depth perception.

The optics in a preferred embodiment comprise a catadioptric system, with a negative lens as a first element and a positive element positioned opposite the negative lens, with a cube beam splitter between the lenses. The cube beam splitter, which shortens the optical path by virtue of its refractive index, has a partially transmissive/partially reflective surface, preferably about 50/50. Light from the video screen is first passed through the negative lens and is transmitted through the cube beam splitter. It then encounters the positive lens with a reflective coating on its outer (back) surface, which reflects the light back through the lens and into the beam splitter. At the beam splitter the beam is now reflected toward the observer's eye. The beam splitter is thus used twice: once in transmission and once in reflection. The net light transmission to the eye is the product of the reflectance, R, and transmittance, T, of the beam splitter. This quantity is termed the RT product and must be calculated separately for each polarization. Thus, for a non-polarizing beam splitter with a reflectance of 50% and a transmittance of 50%, the RT product is 25%. If the reflectance is 40% and the transmittance is 60% the RT product is 24%, only a slight change from the 25% for a 50/50 beam splitter. The use of the beam splitter in double pass reduces the spectral variation of the viewed image from that which would be observed in reflection or transmission alone. Some care must be taken in not using highly polarized coatings on the beam splitter since the RT product for each polarization will be low resulting in dim images. The user is able to see through the beam splitter cube to the ambient scene beyond, at approximately 50% of the ambient light level in the preferred embodiment.

The system comprises a retro-focus telephoto lens that gives both a wide field of view and magnification at the same time.

A pair of headphone type speakers are supported on pivotal arms connected to a frame of the headset, such that the arms support the speakers at the ears, with provision for rotational adjustment about a pivot mount on the headset frame, to accommodate different users. The speakers may also include a sliding adjustment for further versatility in positioning. An important feature is that the speakers, preferably open-cell foam muffs, are mounted so as to contact the ears only lightly, with virtually no pressure on the ears, for enhancing comfort. Compensation for the lack of pressure against the ears (which causes low-end loss) can be made with a low frequency boost circuit. A user-adjustable high frequency filter may be included in the sound equipment to suppress high frequency noise which often accompanies some video programs.

The headset straps are length-adjustable for maximum comfort and accommodation of different users' physical characteristics. A further adjustment preferably included in the video headset is an adjustment of the interocular separation distance, to accommodate a range of interocular separations of different users. This can range from about 4 to 7 cm.

In one preferred embodiment the video screens are liquid crystal displays, of a diagonal dimension of about 0.7 inch. These may be the same type color LCD screens used in the monitor of a video camera, but more preferably they are of higher resolution, approximately 640 by 480 pixels.

The optics of the system are preferably such as to show the user an apparent 57-inch television screen at about eight feet in front of the user (approximately a 33 degree full diagonal field of view), although the user can to some extent mentally control the perception of screen size and distance, with some influence by the ambient light level admitted to the user's eyes, via another adjustment described below. The optics are designed as a compromise between magnification and eye-relief, i.e. the distance from the back of the beam splitting prism to the eye. In order to accommodate eye glasses and provide clearances between the face and the prism, there is a desire to maximize this distance. This, however, comes at the expense of increasing the size and weight of the optics and/or reduction of the magnification.

Ambient light level adjustment is achieved in one preferred embodiment of the invention with a transparent shield forward of the optics, including a user-controllable adjustment associated with the shield as to the level of ambient light to be let through to the user. This can comprise a liquid crystal shutter with a means for the user to switch the shutter from substantially opaque to near-transparent. Alternatively, the shield can include electrochromatic means for adjusting the shield to transmit more or less light to the user.

A further feature which may be included is an easily accessible switch enabling the user to turn off the video displays temporarily, without removing the headset, to better view the space beyond the headset.

In the video headset of the invention the video screens and optics preferably are arranged to present fully binocular vision; however, if desired the two screens can present overlapping images, for a wider field of view wherein most of the scene viewed by the user is binocular, but the left and right edges of the pictures are monocular, as they are in normal unaided vision.

Virtual reality features can be incorporated with or used with the headset of the invention. Various types of head tracking can be employed, which may include an inclinometer or a magnetometer. This is coordinated with a changing field of view presented by the video, and similar changes can be applied to the sound.

Preferably most or all of the electronic controls for the headset, as well as videotape (or disc) player and sound alternatives, are carried in a separate controller unit connected to the headset with a cable.

It is therefore among the objects of the invention to provide a video headset having improved features in the areas of physical comfort to the user, visual and audio comfort to the user, compact and rugged design, and versatility in various adjustments and the ability to control the brightness of the user's vista beyond the optics. Realistic video and audio images are a related goal. These and other objects, advantages and features of the invention will be apparent from the following description of a preferred embodiment, considered along with the accompanying drawings.

DESCRIPTION OF PREFERRED EMBODIMENTS

Figure 1:
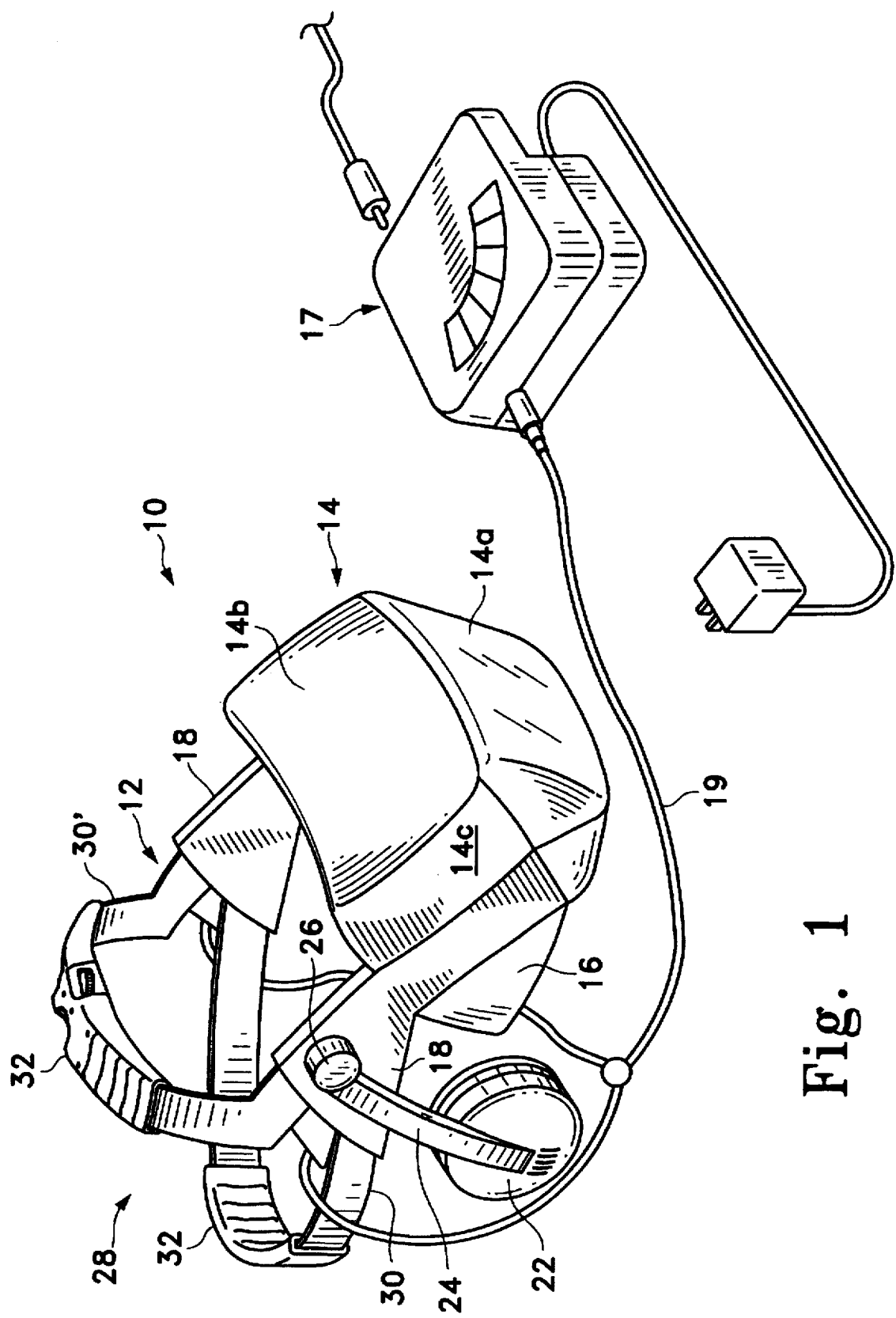
FIG. 1 is a perspective view showing a preferred form of the video/audio headset of the invention, connected to a separate control unit.

The audio/video headset according to the invention can be designed in many ways. FIG. 1 shows a preferred embodiment in a perspective view. The main external parts of the audio/video headset 10 comprise a headset frame 12, a visor assembly 14, two lateral flanges or side flanges 16, and two temple pieces 18 which can be considered as part of the headset frame 12. The width of the frame 12 corresponds closely to the width of a human head, e.g. from 13 to 16 cm; the height of the visor assembly 14 is at least sufficient to completely cover the vertical field of vision of a human eye. The frame 12 is made of a durable, lightweight plastic. This plastic is opaque to prevent incident light from reaching the eyes of a user 20. The lateral flanges 16 are mounted on each side of the frame 12 as shown. They are made of an opaque, durable, lightweight plastic and are also designed to intercept stray light from the sides.

The visor assembly 14 is mounted on the frame 12 to cover the remaining field of vision of the user 20. It includes a front panel 14a, a top panel 14b and side panels 14c. In its middle section the visor front panel 14a is essentially plane while its side ends curve convexly back as shown. Suitable materials for the front panel 14a include transparent plastics, glass, and other materials which transmit visible radiation, so that the panel serves as a substantially transparent shield. In the preferred embodiment the panel 14a has a means for ambient light level adjustment, under the control of the user via a separate control unit 17 connected to the headset by a cable 19. The shield 14a can include a mechanical shutter or can comprise an electrically actuated light valve of a liquid crystal or electrochromatic type, adjustable from near-opaque to near-transparent. The shutter could even comprise two polarizers whose orientations can be mechanically altered to pass or attenuate the ambient light. Such adjustable screens or shields are well known in the art.

The two temple pieces 18 project back from either side of the frame 12, preferably being integral with the frame. They are designed to fit lightly against the sides of the head immediately above the ears, preferably not resting on the ears. In the preferred embodiment the pieces 18 are wedge-shaped as shown. Two headphone speakers 22 for the user's left and right ear are each attached to the end of a pivot arm 24, one on each side. The opposite ends of the pivot arms 24 are mechanically joined to the temple pieces 18 by pivoted joints 26. Thus, the position of the headphone speakers 22 in relation to the frame 12 is adjustable. In one embodiment the joints 26 may be designed to allow the pivot arms 24 to be shortened and lengthened (not shown in the drawings), toward and away from the user's head, although a slight flexibility in the arms 24 and the frame 12 can accomplish this adjustability. These adjustments ensure a high degree of freedom in adjusting the position of the speakers 22 to fit over the ears of the user. In effect, the speakers can provide an additional point of support for the headset 10 on the user's head 20, although preferably the speakers 22 include a foam muff at the ear side (not shown), with the arms 24 and other structure arranged such that the muffs contact only lightly, with virtually no pressure against the ears.

Figure 2:
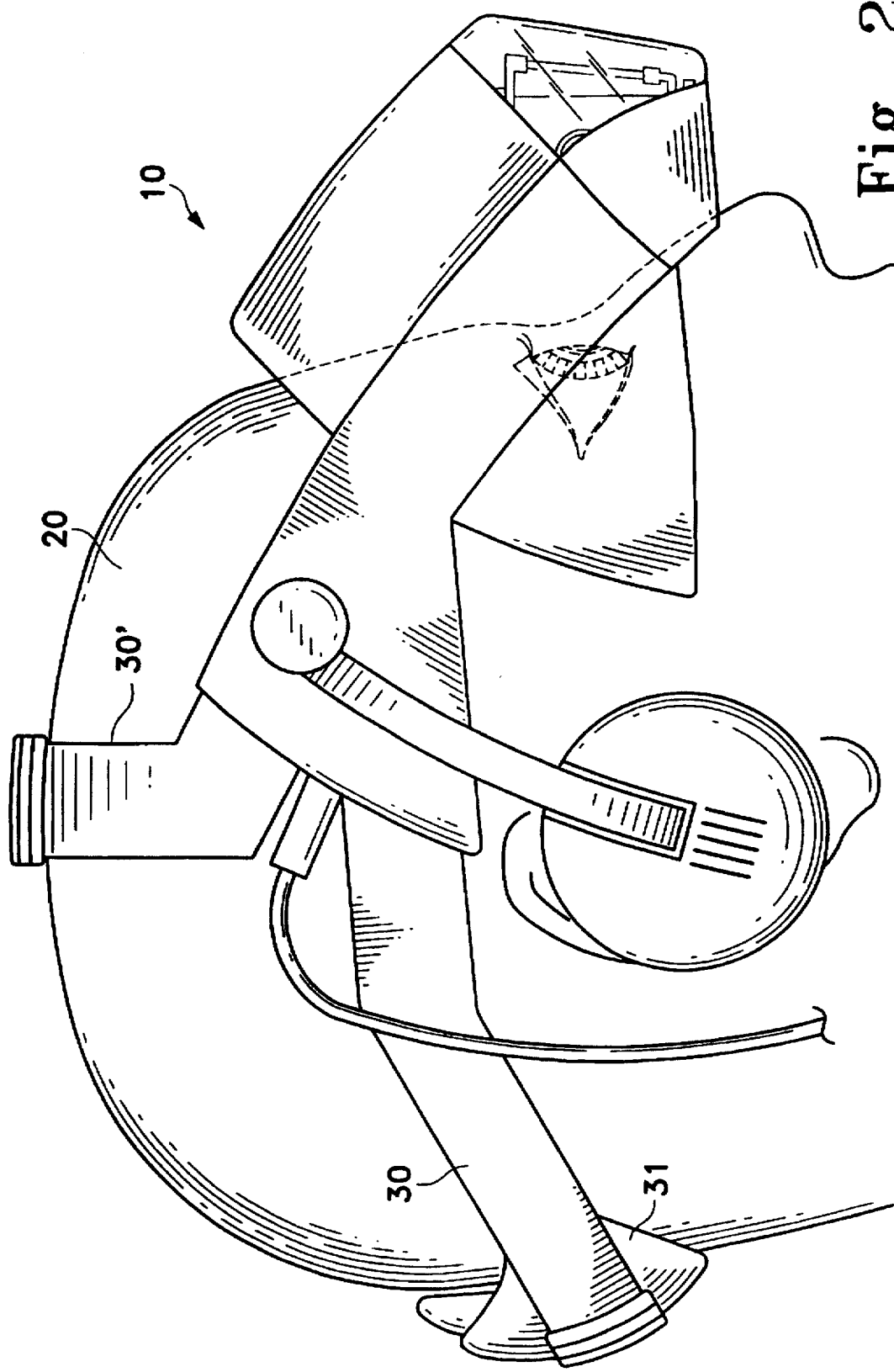
FIG. 2 is a side elevation view showing the video headset device, schematically indicating the position of the device on the head of a user.

A strap device 28 is mechanically attached to rearward portions of the temple pieces 18. In the preferred embodiment the strap apparatus 28 is composed of two bands 30, 30' of substantially rigid material. Strap adjustments 32 are provided to regulate the length of the bands 30, 30' for proper, comfortable fit on the head. Any conventional overlap band adjustment can be used, such as the types with plastic snaps or hook and loop fasteners. As shown in this embodiment, the bands 30, 30' are designed to engage the lower back of the user's cranium at the rear of the head and also the top or crown of the head, so as to be capable of supporting the headset 10 over the user's eyes while leaving ample space between the visor 14 and the user's face, including space for eyeglasses. The support is better illustrated by FIG. 2, which schematically indicates the position of the headset 10 on the head 20 of the user. In the most preferred embodiment the bands 30, 30' are capable of holding the headset 10 over the user's eyes without any additional support points on the user's head, and especially not on the nose. This is accomplished by providing the principal support with crown headband 30', and an engagement against the lower back of the head with the band 30. The band 30 preferably has secured to it a counterweight 31 to offset the tipping moment of the visor assembly 14.

Figure 3:
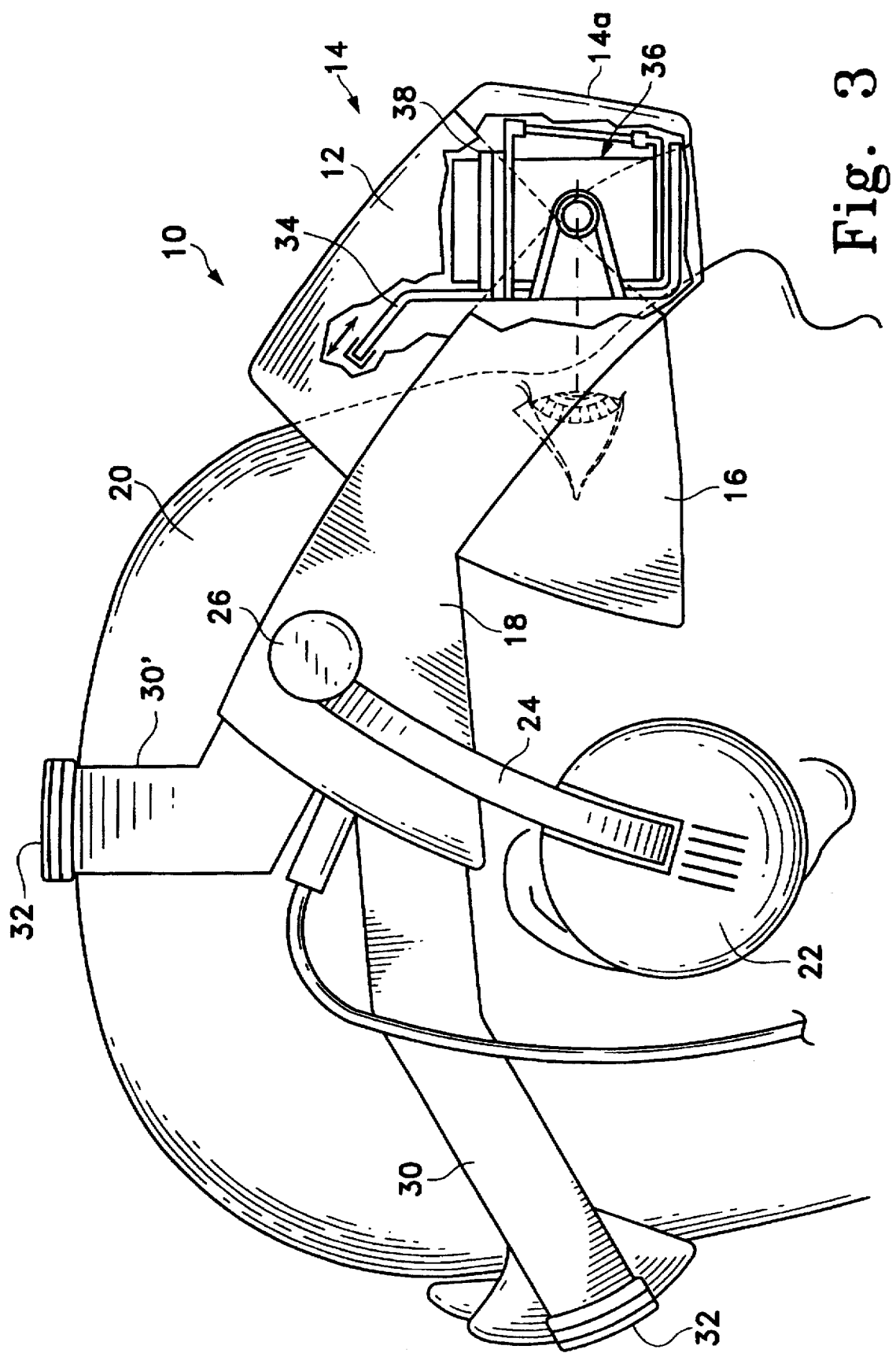
FIG. 3 is a view similar to FIG. 2, but indicating positions of some optical elements within the headset.

The drawing in FIG. 3 illustrates diagrammatically the inside of the visor assembly 14, which is equipped with an attachment rail 34. The rail may be movably joined to the frame 12 as indicated by the arrows, as one form of adjustment. Two imaging units 36 and 36' (only one imaging unit 36 can be seen in the side elevation view of FIG. 3), intended for projecting video images to the user's right and left eyes respectively, are mounted on the rail 34 by means of fastening clips 38. The clips 38 comprise the top portion of the unit 36 and are made of sufficiently resilient plastic to ensure a good grip when snapped on the rail 34.

Figure 4:
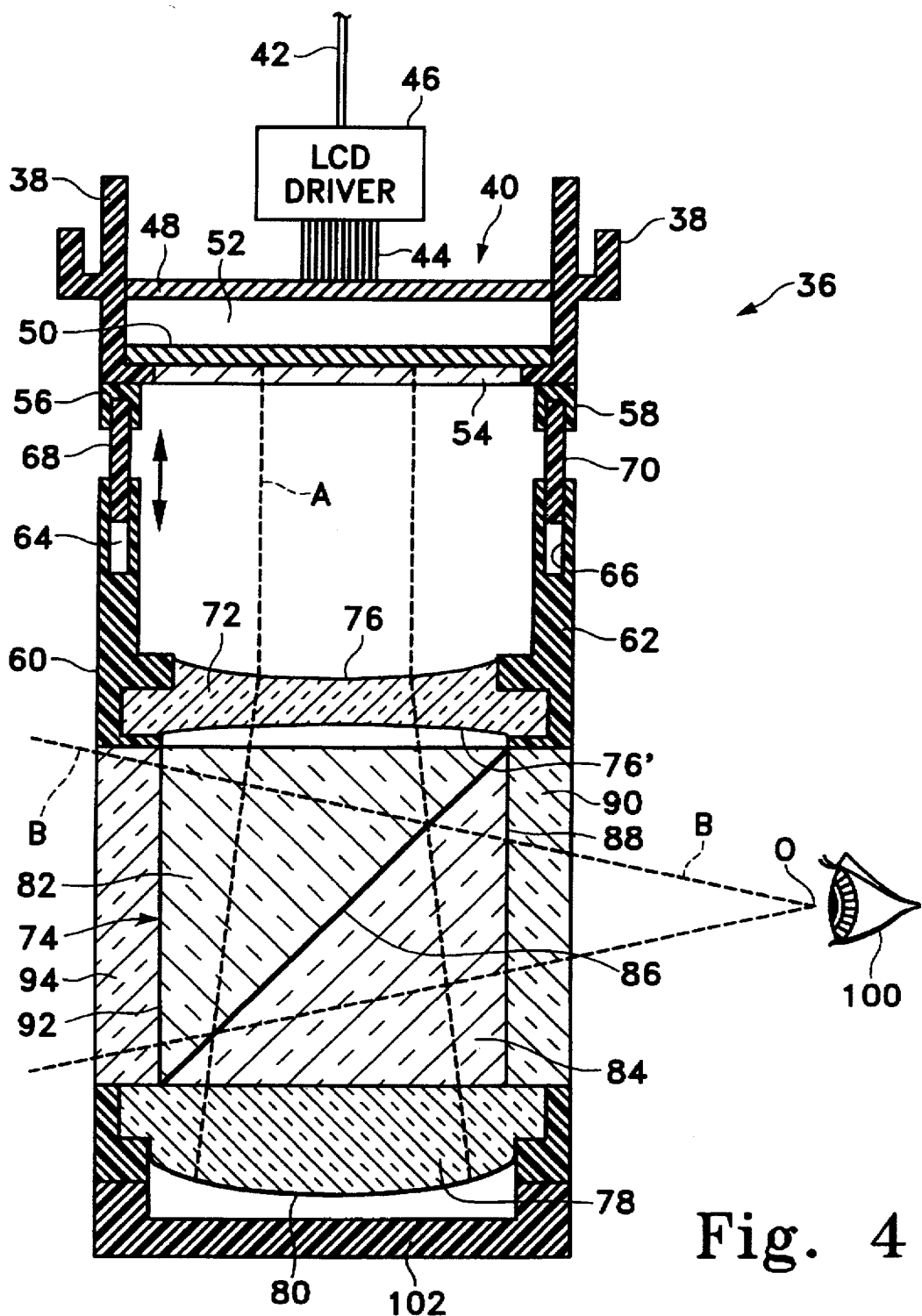
FIG. 4 is a detail view in cross section showing video optics in one preferred embodiment of the invention.

FIG. 4 is a detailed cross-sectional view of a preferred form of imaging unit 36. Between the clips 38 the top portion of the unit 36 contains a liquid crystal display 40 (LCD) for displaying images, and a liquid crystal display driver 46 equipped with connecting cables 42 and 44. In the preferred embodiment the LCD 40 measures approximately 3 mm in thickness, 23 mm in length and 40 mm in width. The cable 44 connects the driver 46 to electronic control, processing, and image delivery circuits (not shown) while the cable 42 leads to the LCD 40. In particular, the cable 42 is connected to a top electrode 48 and a bottom electrode 50, both belonging to the LCD 40. The LCD driver 46 is thus in communication with the LCD 40 and, as is commonly known, by controlling a set of pixels consisting of individual liquid crystal elements 52 sandwiched between top and bottom electrodes 48 and 50, it can generate video images on the LCD 40. Furthermore, a thin depixelization plate 54 is joined to the bottom electrode 50. The plate 54 may be made of etched Mylar or a sufficiently high density grating to smear or blur any visible delineations or distinctions between the liquid crystal elements 52 (pixels) when an image is being projected.

Meanwhile, the LCD 40 is lodged and held in place between the clips 38, as indicated in FIG. 4. The clips 38 are permanently joined to sockets 56 and 58 which belong to a front brace 60 and a back brace 62 respectively. The top portions of the front brace 60 and the back brace 62 have sliding canals 64 and 66. Two sliding members 68, 70 projecting from the sockets 56, 58, inside which they are permanently fixed, extend into the canals 64, 66. The sliding members 68 and 70 can slide in and out of the canals 64, 66 by a certain distance, e.g., 1 to 3 mm, which is predetermined by suitably arranged stops or other arresting mechanisms (not shown). This sliding movement of the sliding members 68, 70 allows control of the distance and inclination of the LCD 40 with respect to a biconcave lens 72 retained between the front and back braces 60, 62 above a cube beam splitter 74. In the preferred embodiment the distance between LCD 40 and the lens 72 is about 12 mm. Of course, many other mechanical arrangements are possible for selecting a desired relative position of the LCD 40 with respect to these optical elements.

The biconcave lens 72 is made of glass or plastic, preferably polystyrene plastic, and has two concave faces 76 and 76'. The curvature of the faces 76, 76' is adapted to diverge the video image projected by the LCD 40 and indicated by dotted lines A to reach a maximum area at the back face of a convex lens 78 mounted below the beam splitter cube 74. The convex lens 78 is preferably made of the same material as the biconcave lens 72, and its back face is treated with a conventional reflective coating 80, so that the lens serves as a reflective lens.

The optical system is composed of three elements, namely, from the video display to the eye: a negative refractive component, a beam splitter and a positive reflective component. The combination of the negative and positive components provides a telephoto function relative to the video display, and a reverse telephoto function relative to the eye. This reverse telephoto arrangement provides the increased eye-relief desirable to make the unit easy to use. The beam splitter is used in a double pass, described further below, which helps minimize the size of the optical assembly. Increased magnification and eye-relief is possible by making the beam splitter in the form of a cube assembly. The use of a solid beam splitter with a refractive index above 1.45 greatly enhances the eye-relief and magnification. If it were not for the increasing weight of glass with high refractive index, very high refractive index glass would be used. In the case of a head-mounted unit, a trade-off must be made between magnification, eye-relief and overall weight.

The beam splitter cube 74 is made of a lightweight glass or plastic. Highest quality is obtained with a glass beam splitter. In a preferred embodiment its dimensions are 23 mm×23 mm×40 mm (height, length, width) and it consists of a top prism 82 and a bottom prism 84. The interface between the adjoining faces of the prisms 82 and 84 is inclined at 45° with respect to the beam path shown very generally with dotted lines at A and comprises a partially transmissive/partially reflective coating 86. Such coatings are well known and commercially available and can be applied to the surface of one of the prisms, with the two sections then cemented together. In the preferred embodiment the transmissive/reflective ratio of the coating 86 is 50/50, i.e., 50% of an incoming beam is reflected at 45° to the incoming beam and 50% of it is transmitted through the interface, in the original direction. In this particular embodiment the reflected portion of the incoming beam A follows a beam path generally indicated by dotted lines B. It is important to keep the RT product of the beam splitter fairly constant across the visible spectrum so as not to impart a tint to the viewed video image.

The beam splitter 74 is positioned such that the lateral side 88 of the bottom prism 84 rests flush against a window 90 in the rear brace 62. The window 90 is made of a transparent, lightweight plastic and corresponds to the dimensions of the side 88, i.e. it is rectangular and measures 23 by 40 mm. Meanwhile, a lateral side 92 of the top prism 82 is adjacent to a shutter mechanism 94 which may be mounted in the front brace 60. The shutter mechanism 94 has the same dimensions as the window 90. In one embodiment the mechanism 94 comprises an adjustable liquid crystal shield connected by a connection line 96 to a brightness adjustment which can be on the control unit 17 shown in FIG. 1. The setting of this adjustment 98 determines the polarization of the liquid crystal shield 94, and consequently the amount of external light which can pass through to and arrive at a point 0 beyond the window 90. The point 0 corresponds to the position of an eye 100 of the user. An alternative, and more preferred arrangement is to have the ambient light adjustment shutter in the shield or front panel 14a at the front of the headset assembly, as discussed above.

Although in FIG. 4 the adjustment for the ambient light adjustment shutter 94 preferably is on the separate control unit, it can be disposed on the headset frame 12 itself or on one of the elements described above as connected to the frame, in a place easily accessible to the user.

Below the convex lens 78 is located a bottom plate 102. This plate 102 is joined directly to the braces 62 and 64 to seal off the bottom portion of the imaging unit 36. Additional adjustments to control the position of the plate 102 and the convex lens 78 can be provided in other advantageous embodiments.

Figure 5:
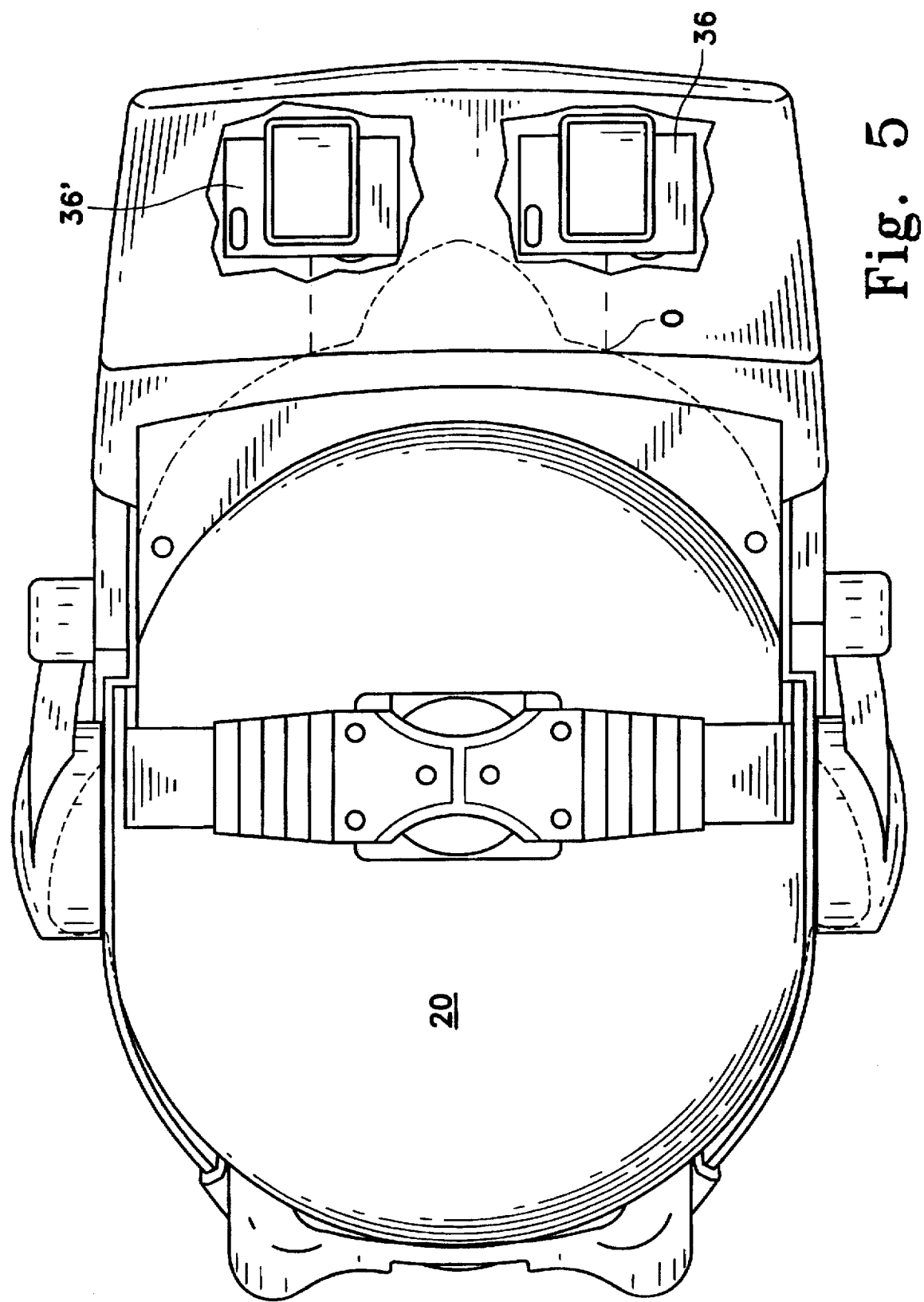
FIG. 5 is a top schematic view showing generally the positional relationship between the video optics and the user.

FIG. 5 is a top schematic diagram showing the two imaging units 36, 36' of the headset, located in front of the two eyes at approximately 2 to 3 cm from the eyes, a distance which preferably is adjustable. The nose is not contacted by the visor assembly or frame.

The audio/video headset 10 offers to the user a wide range of comfortable and convenient adjustments. When the user first puts on the headset 10 he can adjust the position of the entire headset by using the strap adjustment 32 to tighten or loosen the bands 30, 30'. When under proper tension the bands 30, 30' will ensure that temple pieces 18 are properly situated against the temples of the user. Next, the user will swivel the pivot arms 24 and adjust the length of the arms to properly seat the headphone speakers 22 on his ears, which can in effect serve as two additional points of support for the headset 10, although the speakers preferably contact the ears only lightly.

At this point the user's eyes 100 will be located at point 0 of FIGS. 4 and 5. The user can adjust the distance from this point to the imaging units 36 and 36' by moving the rail 34. The separation between the units can be changed by sliding the clips 38 along the rail 34.

Once the headset 10 is properly positioned and adjusted a video image can be delivered via the connection cable 42 to the LCD driver 46 from electronic control, processing, and image delivery circuits (not shown), preferably located in the waist-worn control unit (not shown). Of course, the video image may be completely arbitrary, including television transmissions, video games, and computer-manipulated images of any number of arbitrary objects and/or scenes. In one embodiment, the image may be a magnified or otherwise altered view of the external world in front of the user's headset. This is especially useful for users with defective vision to correct for their eyesight deficiencies.

The LCD driver 46 communicates the electronic image information to the LCD 40 via the connection cable 44. In particular, the electronic signals are routed to the top electrode 48 and the bottom electrode 50. These electrodes apply corresponding voltages across the liquid crystal elements (pixels) 52 to generate the color image. This technology is state-of-the-art and well known.

The light from each pixel 52 passes through the bottom electrode 50 and then through the depixelization plate 54, which effectively smears or blurs the outlines between image portions projected by the individual pixels 52 without noticeable loss of resolution. A continuous image is created in this manner.

Figure 4A:
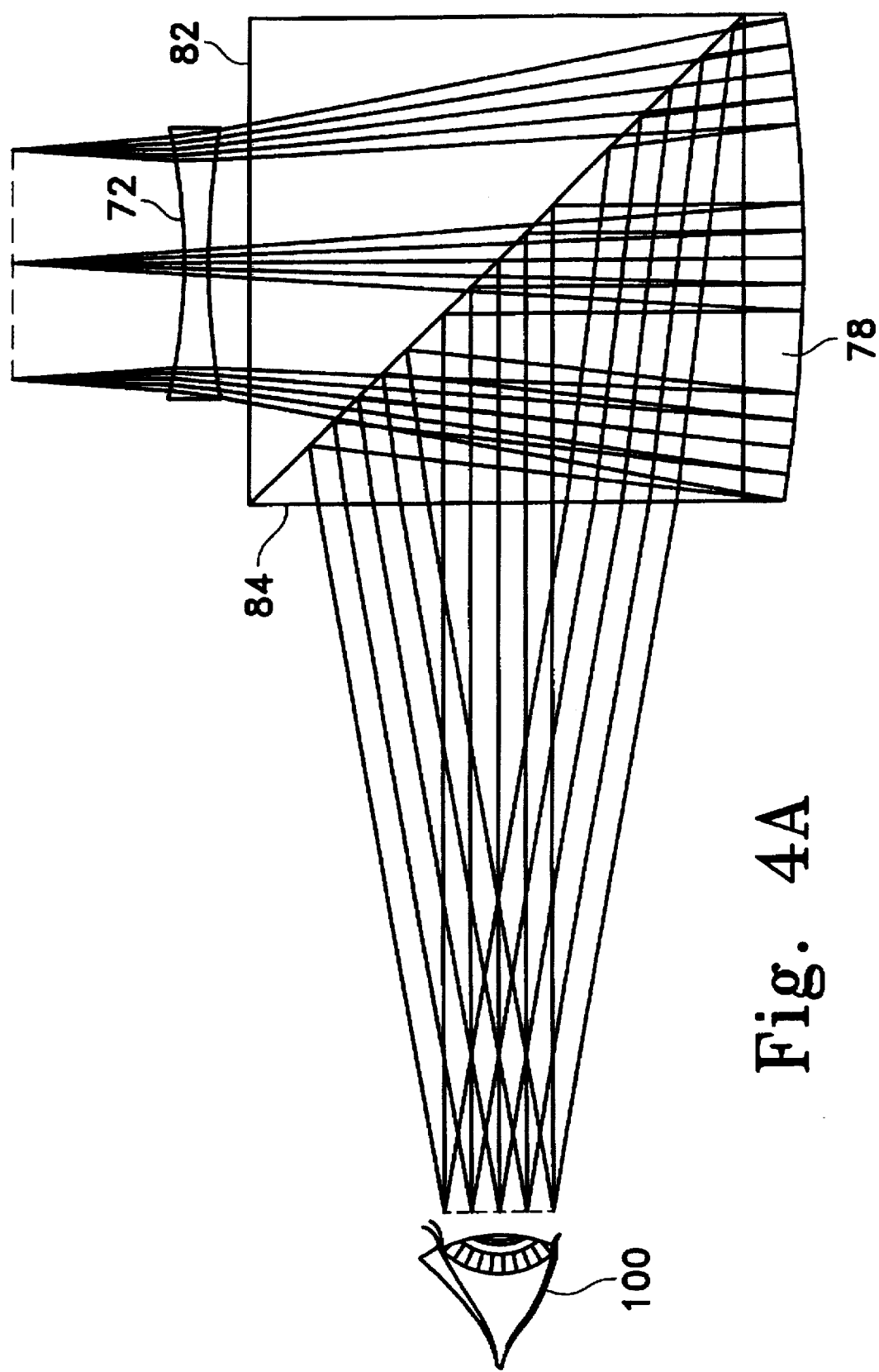
FIG. 4A is a schematic view showing optics and light ray paths for the system shown in FIG. 4, but reversed from FIG. 4 relative to viewer position.

Light from this image then propagates through the negative lens 72 and into the beam splitting prism 74. Light hits the beam splitter 86, directing some of the light out of the front of the unit, away from the viewer's eyes. Approximately one-half of the light continues through the beam splitter and enters the reflective element 78. FIG. 4A shows the ray paths more accurately. Light then impinges upon a concave reflective surface 80, which serves to product a virtual image. This light is directed by the reflective beam splitter coating 86 back through the beam splitter half 84. Thus it is then partially reflected by the beam splitting surface toward the observer's eye 100, at approximately 25% of original light level.

In one preferred embodiment, preferred optical parameters are as follows:

The field of view is comparable to that of a 60-inch diagonal television display at a distance of 8 feet. The field of view to the corners of the format is +/−17.8 degrees.

LCD to Negative lens distance=8.2 mm

Negative lens—material polystyrene—refractive index 1.59
  Center thickness=1.2705 mm
  Radius facing LCD display=30.9 mm concave
  Radius facing away from LCD display=42.279 mm concave
  Distance to beam splitter=1.694 mm Beam splitter—material Schott BK7—refractive index 1.517
  square cross section 23 mm on a side
  length chosen to provide for different inter-pupillary distances
  beam splitter coating along buried hypotenuse Reflective element—material acrylic—refractive index 1.4917
  glued or slightly spaced from beam splitter element
  center thickness=3.388 mm
  radius facing cube=plano—a slight radius may be introduced to improve moldability
  radius with reflective coating=79.39 mm convex Eye is placed 33.46 mm from face of cube. Note that this design allows for a considerable variation in eye placement with satisfactory optical performance.

In preferred parameters the optical system has a focal length of 34.14mm. More generally, the focal length preferably is in the range of about 25–50 cm. Longer focal length gives lower magnification.

In the preferred embodiment the user can adjust image intensity, or turn off the LCD 40 by means of a switch (not shown) on the portable control unit 17 (FIG. 1). This in conjunction with the user's visibility to the scene beyond enables interruption without removal of the headset. Moreover, focus can be adjusted by moving the sliding members 68, 70 inside the sliding channels or canals 64, 66. This changes the distance between the LCD 40 and the biconcave lens 72. The focus adjustment of the image from the LCD can compensate for the user's refractive error so as to eliminate the need for spectacles, if desired.

Although a specific convergent adjustment feature is not shown in the drawings, such an adjustment is desirable. One simple matter of achieving a convergent adjustment is to provide for horizontal adjustment movement of the LCDs 40. Movement of the LCDs left and right (with greater or lesser separation between them) will achieve horizontal convergence adjustment. Another method is to provide for rotation of the cube prisms about vertical axes; manipulation of other optical elements described above can also be used to achieve convergence adjustment. As will be appreciated by those of skill in the art, there are many ways to provide for convergence adjustment. In addition, vergence adjustment, i.e. relative height of the two images to the user, should be adjustable since the eyes have very little latitude in this regard. This can again be achieved by horizontal movement of the LCDs, this time toward or away from the user's forehead. This can also be achieved by manipulation of other optical elements described above.

Meanwhile, external light carrying images of the world in front of the user passes through the visor front panel 14a and through the shutter mechanism 94, if this latter shutter is included—as above, the visor front panel may have this light adjustment. In the preferred embodiment where the shutter mechanism (in either location) is a liquid crystal shield its permeability to light is controlled in the conventional manner by applying an appropriate voltage across the liquid crystal cells (the auxiliary electronics are state-of-the-art and are not shown). This is effectuated by regulating the brightness adjustment, which communicates the setting to the shield via a connection line (not shown).

When the ambient light adjustment shield is set to transmit a maximum (essentially 100%) of the light received from the outside, then all light travelling toward the user along path B passes through the visor panel 14a (and the shield 94) essentially unattenuated and enters the cube beam splitter 74. According to the above-described mechanism, approximately 50% of that external light is reflected upward generally along path A, and approximately 50% is passed along to point 0. Consequently, the user's eye 100 sees the external world at about 50% intensity. By changing the setting of the brightness adjustment the user can vary the intensity of external light, i.e. outside images, from about 0% to 50%. As noted above, this adjustment can be provided to control the opaqueness of the visor front panel or shield 14a.

Thus, in the audio/video headset described, the image light beams are essentially manipulated by just two lenses (including a reflective lens) and an interposed cube beam splitter in a catadioptric system. Consequently the beam path is very short because of the effect of higher refractive index occurring in glass or plastic of which the optical elements are made, a very important feature of the invention. Short beam paths, in combination with reflection below the cube back up into the cube, minimize space requirements and allow achievement of the highly compact, rugged, and convenient design described. Tradeoffs can be made with the magnification and focal length of the optical system; the cube (solid) beam splitter could be replaced with a slab beam splitter. This would require that the magnification be lowered by approximately 30% but would also produce cost and weight advantages.

Meanwhile, the headphone speakers 22 supply sound to the ears of the user. The sound can be independent of the video images displayed on the LCD 40 in some cases, but normally it will accompany them. Optionally, the speakers 22 may deliver "Surround Sound". The user can perform all the necessary sound adjustments using the separate controller discussed above.

Although the above-described video headset is very versatile and easily adjustable, it can be supplemented with additional adjustments. For example, in another embodiment the position of the convex lens can be manipulated with the aid of a mechanism analogous to slide members 68, 70 and sliding channels 64, 66 for adjusting the position and inclination of the LCD 40. This gives the user with an uncorrected ocular refractive anomaly more latitude in adjusting the focus of the LCD to compensate for the user's refractive error.

In addition to the above, the user may wear glasses while wearing the video headset 10. This is because the bands 30, 30', the temple pieces 18 and the speakers 22 provide all the support necessary to keep the headset on the user's head without touching the nose. Consequently, there is ample space left between the imaging units 36 and the user's face to accommodate a pair of eyeglasses or spectacles.

It is therefore seen that the described audio/video headset is of rugged construction and efficient compact design. This video headset is convenient to use due to its unique combination of optics and frame adjustments.

Moreover, many changes can be made in the embodiments described without venturing beyond the scope of this invention. For example, the biconcave lens can be made of plastic or glass, and the imagery may be improved further using aspheric optical components.

Virtual reality features can be incorporated into the audio/video headset of the invention by using appropriate signal processing means. The field of vision and amount of overlap perceived by the eyes of the user can be changed electronically with suitable circuits. Finally, each headset can be individualized, i.e. programmed to compensate for the user's particular visual preferences or actual ocular refractive problems. Thus, as is apparent, many alterations can be made to the headset described above.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

We claim:

1. A video headset for wearing on the human head, for presenting video images and sound to the user, comprising:

a strap means for engaging the user's head so as to support the video headset on the head, a headset frame secured to forward ends of said strap means, a pair of video screens, one presenting images to each of the left and right eyes of the user, and means connected to the headset frame for supporting the two video screens, a catadioptric optical means including a pair of reflector means one supported on the headset frame in front of each eye, for receiving an image from one of the video screens and for reflecting the image to the user's eye, each said reflector means being partially reflective and partially transmissive, each of the reflector means being positioned such that each video screen image is first transmitted through the corresponding reflector means and later is reflected by the same reflector means towards the user's eye, each said reflector means permitting the user to see through the reflector means when sufficient light is present in front of the user beyond the headset, ambient light control means in front of the user, forward of said reflector means and supported by said headset frame, for enabling the user to continuously control the brightness of light from outside and forward of the headset, within the user's view, and a pair of headphone speakers, with speaker supporting means connected to the headset frame for positioning a speaker at each ear of the user.

2. A video headset according to claim 1, wherein the ambient light control means comprises a substantially transparent shield connected to and supported by the headset frame and positioned forward of said reflector means, i.e. on the opposite side of the reflector means from the user, with adjustment means under the control of the user for varying the light transmissivity of the shield.

3. A video headset according to claim 2, wherein the shield forward of the screens and optics comprises a liquid crystal shutter with means for switching the liquid crystal shutter from substantially opaque to near-transparent.

4. A video headset according to claim 2, wherein the shield includes electrochromatic means for adjusting the shield to transmit more or less light to the user.

5. A video headset for wearing on the human head, for presenting video images and sound to the user, comprising:

- a strap means for engaging the user's head so as to support the video headset on the head,
- a headset frame secured to forward ends of said strap means,
- a pair of video screens, one presenting images to each of the left and right eyes of the user, and means connected to the headset frame for supporting the two video screens,
- a catadioptric optical means including a pair of reflector means one supported on the headset frame in front of each eye, for receiving an image from one of the video screens and for reflecting the image to the user's eye, and wherein the positioning of the video screens, and the optical means, include means forming an overlapping field of view from the two video screens, so that the image presented to the user is only partially binocular, being monocular in left and right outer regions,
- each said reflector means being partially reflective and partially transmissive, each of the reflector means being positioned such that each video screen image is first transmitted through the corresponding reflector means and later is reflected by the same reflector means towards the user's eye,
- each said reflector means permitting the user to see through the reflector means when sufficient light is present in front of the user beyond the headset, and
- a pair of headphone speakers, with speaker supporting means connected to the headset frame for positioning a speaker at each ear of the user.

* * * * *